(12) United States Patent
Abhyankar et al.

(10) Patent No.: US 7,003,166 B2
(45) Date of Patent: Feb. 21, 2006

(54) METHOD OF ENCODING DATA IN A MONOCHROME MEDIA

(75) Inventors: Vishwas G. Abhyankar, Pittsford, NY (US); Victor C. Wong, Rochester, NY (US); Robert Breslawski, Brockport, NY (US); Robert S. Jones, Rochester, NY (US); Badhri Narayan, Rochester, NY (US); Robert V. Reisch, Fairport, NY (US); Donald R. Williams, Williamson, NY (US); Robert B. Bayley, Hilton, NY (US); Richard Weil, Pittsford, NY (US); Robert G. Duncan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 173 days.

(21) Appl. No.: 10/059,994

(22) Filed: Jan. 29, 2002

(65) Prior Publication Data

US 2003/0142327 A1 Jul. 31, 2003

(51) Int. Cl.
*G06K 9/36* (2006.01)
*H04N 5/14* (2006.01)

(52) U.S. Cl. .......... 382/237; 382/232; 348/701
(58) Field of Classification Search ........... 382/232, 382/237, 166; 348/701, 620; 600/407; 358/444, 358/403, 404
See application file for complete search history.

(56) References Cited

U.S. PATENT DOCUMENTS

| 4,688,031 | A | | 8/1987 | Haggerty | 345/600 |
|---|---|---|---|---|---|
| 4,703,318 | A | | 10/1987 | Haggerty | 345/634 |
| 4,939,354 | A | | 7/1990 | Priddy et al. | 235/456 |
| 5,091,966 | A | | 2/1992 | Bloomberg et al. | 382/203 |
| 5,278,400 | A | | 1/1994 | Appel | 358/3.28 |
| 5,335,082 | A | | 8/1994 | Sable | 347/232 |
| 5,502,576 | A | * | 3/1996 | Ramsay et al. | 358/444 |
| 5,557,430 | A | | 9/1996 | Isemura et al. | 358/501 |
| 5,606,379 | A | | 2/1997 | Williams | 396/308 |
| 5,701,401 | A | | 12/1997 | Harrington et al. | 358/1.9 |
| 5,740,801 | A | * | 4/1998 | Branson | 600/407 |
| 5,818,966 | A | | 10/1998 | Prasad et al. | 382/232 |
| 5,877,819 | A | * | 3/1999 | Branson | 348/701 |
| 6,098,882 | A | | 8/2000 | Antognini et al. | 235/454 |
| 6,169,607 | B1 | | 1/2001 | Harrington | 358/1.9 |
| 6,179,485 | B1 | | 1/2001 | Harrington | 358/1.9 |

OTHER PUBLICATIONS

Feng et al., "Rate Distortion Optimized Document Coding Using Resolution Enhanced Rendering", IEEE International Conference on Image Processing, vol. 3, Oct. 2001, pps. 430–433.*

Biswas, "Hilbert Scan and Image Compression", IEEE International Conference on Pattern Recognition, vol. 3, Sep. 2000, pps. 207–210.*

* cited by examiner

*Primary Examiner*—Anh Hong Do
(74) *Attorney, Agent, or Firm*—Nelson Adrian Blish

(57) ABSTRACT

A method for encoding data in a monochrome media utilizing the capability of the media for grayscale resolution. A document is processed to provide an image in electronic format, in which each pixel has an assigned data value with a given bit depth. A mapping operation is performed for generating a monochrome data word (120), preferably having a reduced bit depth. The monochrome data word (120) can be used to encode multiple data fields (114, 116, 118). A printer (92) then produces a preserved document record (90) in which the appropriate monochrome data word (120) determines the grayscale value for each pixel.

63 Claims, 8 Drawing Sheets

```xml
<Color_Encoding_Metadata>
    <Preservation_Media>
        <Media_Read_Calibration>
            <Step_Wedge_Target_Location>
                <Frame_Number>5</Frame_Number>
                <Location_in_Frame>
                    <x>1 mm</x>
                    <y>1 mm</y>
                </Location_in_Frame>
            </Step_Wedge_Target_Location>
            <Step_Wedge>
                <Number_of_Density_Steps>3</Number_of_Density_Steps>
                <Density_Step ID="1">
                    <Density_Value>.10</Density_Value>
                    <Size>3 x 3 mm</Size>
                </Density_Step>
                <Density_Step ID="2">
                    <Density_Value>1.0</Density_Value>
                    <Size>3 x 3 mm</Size>
                </Density_Step>
                <Density_Step ID="3">
                    <Density_Value>2.0</Density_Value>
                    <Size>3 x 3 mm</Size>
                </Density_Step>
            </Step_Wedge>
        </Media_Read_Calibration>
        <Media_Write_Calibration>
            <Step_Wedge>
                <Number_of_Density_Steps>3</Number_of_Density_Steps>
                <Density_Step ID="1">
                    <Code_Value>0</Code_Value>
                </Density_Step>
                <Density_Step ID="2">
                    <Code_Value>128</Code_Value>
                </Density_Step>
                <Density_Step ID="3">
                    <Code_Value>255</Code_Value>
                </Density_Step>
            </Step_Wedge>
        </Media_Write_Calibration>
    </Preservation_Media>
    <Writer_Characteristics>
        <Spot_Size>
            <Dot_Pitch>3.3 microns</Dot_Pitch>
            <Dot_Width>6.0 microns</Dot_Width>
        </Spot_Size>
        <In_Track_DPI>8000</In_Track_DPI>
        <Cross_Track_Pitch>3.3 microns</Cross_Track_Pitch>
    </Writer_Characteristics>
</Color_Encoding_Metadata>
```

```
<?xml version="1.0" encoding="UTF-8"?>
<Image_Color_Encoding>
  <Color_Coding_Name>CIELab</Color_Coding_Name>
  <Number_of_Channels>3</Number_of_Channels>
  <Numbe_of_Color_Encoded_Monochrome_Images>1</Numbe_of_Color_Encoded_Monochrome_Images>
  <Monochrome_Value_Bit_Depth>8</Monochrome_Value_Bit_Depth>
  <Mapping_Method_Name>Global Frequency Analysis</Mapping_Method_Name>
  <Mapping_Scheme>Map Minimum to Maximum Value</Mapping_Scheme>
  <Mapping_Bit_Grouping_Catagory>Bit Wise Linear</Mapping_Bit_Grouping_Catagory>
  <Bit_Relation_Mapping>
    <Color_Channel ID="1">
      ⋮
    </Color_Channel>
    <Color_Channel ID="2">
      ⋮
    </Color_Channel>
    <Color_Channel ID="3">
      ⋮
    </Color_Channel>
  </Bit_Relation_Mapping>
</Image_Color_Encoding>
```

Fig. 10a

```xml
<Color_Channel ID="1">
  <Name>Lightness (L)</Name>
  <Number_of_Bits>4</Number_of_Bits>
  <Monocrome_Bit_Position>7,6,5,4</Monocrome_Bit_Position>
  <Most_Significant_Bit>7</Most_Significant_Bit>
  <Image_Color_Channel_Value_Range>0 to 100</Image_Color_Channel_Value_Range>
  <Mapping_Definition>
      <Channel_Value min="0" max="5">
          <Encoded_Value>0</Encoded_Value>
          <Decode_Value>0</Decode_Value>
      </Channel_Value>
      <Channel_Value min="6" max="11">
          <Encoded_Value>1</Encoded_Value>
          <Decode_Value>6</Decode_Value>
      </Channel_Value>
      <Channel_Value min="12" max="17">
          <Encoded_Value>2</Encoded_Value>
          <Decode_Value>12</Decode_Value>
      </Channel_Value>
      <Channel_Value min="18" max="25">
          <Encoded_Value>3</Encoded_Value>
          <Decode_Value>18</Decode_Value>
      </Channel_Value>
      <Channel_Value min="26" max="31">
          <Encoded_Value>4</Encoded_Value>
          <Decode_Value>26</Decode_Value>
      </Channel_Value>
      <Channel_Value min="32" max="37">
          <Encoded_Value>5</Encoded_Value>
          <Decode_Value>32</Decode_Value>
      </Channel_Value>
      <Channel_Value min="38" max="43">
          <Encoded_Value>6</Encoded_Value>
          <Decode_Value>38</Decode_Value>
      </Channel_Value>
      <Channel_Value min="44" max="51">

<Channel_Value min="52" max="57">

<Channel_Value min="58" max="63">

<Channel_Value min="64" max="69">

<Channel_Value min="70" max="77">

<Channel_Value min="78" max="81">
          <Encoded_Value>12</Encoded_Value>
          <Decode_Value>81</Decode_Value>
      </Channel_Value>
      <Channel_Value min="82" max="88">
          <Encoded_Value>13</Encoded_Value>
          <Decode_Value>88</Decode_Value>
      </Channel_Value>
      <Channel_Value min="89" max="94">
          <Encoded_Value>14</Encoded_Value>
          <Decode_Value>94</Decode_Value>
      </Channel_Value>
      <Channel_Value min="95" max="100">
          <Encoded_Value>15</Encoded_Value>
          <Decode_Value>100</Decode_Value>
      </Channel_Value>
  </Mapping_Definition>
</Color_Channel>
```

```xml
<Color_Channel ID="2">
    <Name>Chroma (a)</Name>
    <Number_of_Bits>2</Number_of_Bits>
    <Monocrome_Bit_Position>3,2</Monocrome_Bit_Position>
    <Most_Significant_Bit>3</Most_Significant_Bit>
    <Image_Color_Channel_Value_Range>113 to 195</Image_Color_Channel_Value_Range>
    <!--Image Color Channel Range 113 to 195 maps to CIELab a* range -14 to 68 -->
    <Mapping_Definition>
        <Channel_Value min="113" max="132">
            <Encoded_Value>0</Encoded_Value>
            <Decode_Value>113</Decode_Value>
        </Channel_Value>
        <Channel_Value min="133" max="153">
            <Encoded_Value>1</Encoded_Value>
            <Decode_Value>133</Decode_Value>
        </Channel_Value>
        <Channel_Value min="154" max="174">
            <Encoded_Value>2</Encoded_Value>
            <Decode_Value>174</Decode_Value>
        </Channel_Value>
        <Channel_Value min="175" max="195">
            <Encoded_Value>3</Encoded_Value>
            <Decode_Value>195</Decode_Value>
        </Channel_Value>
    </Mapping_Definition>
</Color_Channel>
```
*94c2*

Fig. 10c

```xml
<Color_Channel ID="3">
    <Name>Chroma (b)</Name>
    <Number_of_Bits>2</Number_of_Bits>
    <Monocrome_Bit_Position>1,0</Monocrome_Bit_Position>
    <Most_Significant_Bit>1</Most_Significant_Bit>
    <Image_Color_Channel_Value_Range>107 to 210</Image_Color_Channel_Value_Range>
    <!--Image Color Channel Range 107 to 210 maps to CIELab b* range -20 to 83 -->
    <Mapping_Definition>
        <Channel_Value min="107" max="132">
            <Encoded_Value>0</Encoded_Value>
            <Decode_Value>107</Decode_Value>
        </Channel_Value>
        <Channel_Value min="133" max="158">
            <Encoded_Value>1</Encoded_Value>
            <Decode_Value>133</Decode_Value>
        </Channel_Value>
        <Channel_Value min="159" max="184">
            <Encoded_Value>2</Encoded_Value>
            <Decode_Value>184</Decode_Value>
        </Channel_Value>
        <Channel_Value min="185" max="210">
            <Encoded_Value>3</Encoded_Value>
            <Decode_Value>210</Decode_Value>
        </Channel_Value>
    </Mapping_Definition>
</Color_Channel>
```
*94c3*

Fig. 10d

METHOD OF ENCODING DATA IN A MONOCHROME MEDIA

CROSS REFERENCE TO RELATED APPLICATIONS

Reference is made to commonly-assigned copending U.S. patent application Ser. No. 10/000,407, filed Nov. 2, 2001, entitled DIGITAL DATA PRESERVATION SYSTEM, by Wong et al., the disclosure of which is incorporated herein.

FIELD OF THE INVENTION

This invention generally relates to a method for long-term preservation of data and more particularly relates to preservation of data associated with an image on monochrome media.

BACKGROUND OF THE INVENTION

In spite of numerous advances in development and use of color imaging media, there are a number of conditions in which monochrome imaging media must be used. For example, archival or long-term preservation of images may require that images be stored on a monochrome media. As another example, there can be advantages to compact storage of images, where it is desirable to use a monochrome media for preserving a color image, with accompanying encoded information.

There can be a considerable amount of data associated with an image, where the data concerns the image itself. For example, in printing applications information about an image can include color separation data for corresponding cyan, magenta, yellow, and black (CMYK) inks or other colorants. Typically, color separations can be stored as separate images on monochrome media, so that each color separation is then stored as a separate monochrome image. For example, U.S. Pat. No. 5,335,082 (Sable) discloses an apparatus using a plurality of monochrome images as separations of a composite color image. Similarly, U.S. Pat. No. 5,606,379 (Williams) discloses a method for storing color images on a monochrome photographic recording medium in which separate R, G, and B or lightness and chroma channels are stored as separate images. Such methods may be acceptable for some types of storage environments, however, it can be appreciated that there would be advantages in storing fewer images and in providing a more compact arrangement.

A number of existing methods for encoding data associated with an image are directed to the problem of encoding color image information within a monochrome image. Examples of solutions for this type of image-data encoding include the following:

U.S. Pat. No. 5,557,430 (Isemura et al.) discloses a method for processing a color image in order to encode color recognition data on a resulting monochrome image. The method described in U.S. Pat. No. 5,557,430 provides some amount of color information available; however, such a method is usable only in limited applications, such as where only a few spot colors are used on a document, such as a business presentation.

U.S. Pat. No. 5,701,401 (Harrington et al.) discloses a method for preserving the color intent of an image when the image is printed on a monochrome printer. Distinctive patterns are applied for each color area.

U.S. Pat. No. 6,179,485 (Harrington) discloses a method for encoding color information in monochromatic format using variously stroked patterns. This method is primarily directed to preserving color intent for fonts and vector (line) drawings. Similarly, U.S. Pat. No. 6,169,607 (also to Harrington) discloses methods for encoding color data in monochrome text using combinations of bold, outline, and fill pattern effects. U.S. Pat. Nos. 4,688,031 and 4,703,318 (both to Haggerty) disclose methods for monochromatic representation of color using background and foreground patterns.

Overall, the methods disclosed in U.S. Pat. Nos. 5,557,430; 5,701,401; 6,179,485; 4,688,031; and 4,703,318 may provide some color encoding that is useful for documents using a very limited color palette, such as business documents and charts. However, these methods would be unworkable for a full-color image, where the need for a pixel-by-pixel encoding would require considerably greater spatial resolution than these methods provide. At best, such methods may be able to provide a rudimentary approximation of color using relative lightness levels. However, there is no provision in any of the schemes given in the patents listed above for encoding of additional data related to the color image when it is represented in monochrome format.

Known methods used for encoding data associated with an image include that disclosed in U.S. Pat. No. 5,818,966 (Prasad et al.), which discloses encoding color information along a sidebar that prints with a monochrome version of a document. This solution would have only limited value, such as with charts and other business graphics using a palette having a few colors.

Each of the solutions noted above is directed to encoding data about the image itself, such as color data. However, it may be useful to encode other types of data that, although not directly concerned with image representation itself, may be associated with an image. For example, an image can have associated audio data, animation data, measurement data, text, or other data, where it is advantageous to have such data coupled in some manner with the image. Use of a sidebar, such as disclosed in U.S. Pat. No. 5,818,966 provides some solution, however, such a solution requires additional media area that may not be inherently coupled to an image. Because most images are stored in a rectangular format, any additional patch of information must be stored above, below, or on either side of the image. Accompanying information would take up additional space on the media. In addition, any encoded information provided in a separate area of the storage medium could be intentionally or unintentionally separated from the image itself.

Methods for encoding data in visible form on a monochromatic medium include the following:

U.S. Pat. No. 5,091,966 (Bloomberg et al.) discloses the use of monochromatic glyph codes encoded onto a document image, in visual juxtaposition to the image. Notably, the area in which the glyph codes are encoded is separate from the document image itself with this solution.

U.S. Pat. No. 6,098,882 (Antognini et al.) and U.S. Pat. No. 4,939,354 (Priddy et al.) disclose methods for encoding digital data onto paper in compact form using bi-tonal markings grouped in a spatial array of cells. The ability to provide increasingly more compact data storage on monochrome media, using methods such as those disclosed in U.S. Pat. Nos. 6,098,882 and 4,939,354, can be attributed, in large part, to continuing improvement in the spatial resolution of desktop scanners.

U.S. Pat. No. 5,278,400 (Appel) discloses a method for encoding data in a cell comprising multiple pixels, where the halftone gray level of each individual pixel, in combination with other pixels within the cell, encodes a data value for the cell. The method disclosed in U.S. Pat. No. 5,278,400 also takes advantage of increased spatial resolution of scanners, supplemented by the capability of a scanner to sense gray level at an individual pixel within a cell.

The methods disclosed in U.S. Pat. Nos. 5,278,400; 6,098,882; and 4,939,354 provide data encoding for compact data storage on a monochrome medium. However, neither these methods, nor the methods disclosed in the patents cited above provide a mechanism for integrally coupling data to an associated image. These methods also require space on the monochrome medium, in addition to that required for the image itself.

Some types of monochrome media, such as paper, for example, allow reproduction of only a limited range of perceptible densities. That is, only a few different density levels can be reliably printed or scanned from such types of media. However, there are other types of monochrome media that have pronouncedly greater sensitivity. Conventional black and white photography film, for example, is able to faithfully and controllably reproduce hundreds of different gray levels, each measurably distinct. Other specialized films and photosensitive media have been developed that exhibit wider overall dynamic range and higher degrees of resolvable density, able to produce a higher number of distinct grayscale values.

It is instructive to observe that the term "grayscale" is conventionally associated with a range of densities where the monochromatic color hue is black. However, for the purposes of this application, the monochromatic color hue, or color base, for a grayscale image need not be black, but could be some other color. For example, some types of monochrome film have a very dark blue color hue that could be used as the color base for grayscale imaging. Regardless of the precise color hue, the term "grayscale" as used herein relates to a range of measurable density values of a single base color, formed at individual pixel locations on a digital preservation medium.

It is instructive to note that the human viewer perceives only a limited number of grayscale gradation values, centered on a range that is well within the overall dynamic range of most types of photosensitive media. Generally, a bit depth of 8-bits is sufficient for storing the grayscale values perceptible in monochrome images. While, for human perception, there may be no need for visible representation exceeding a bit depth of 8-bits, it could be possible to reproduce an image having a larger bit depth, with 10, 12, or greater bits of resolution, for example, using photosensitive media described above. In fact, many conventional scanners have additional sensitivity for grayscale resolution. The four-color printing industry, for example, uses high-resolution color scanners that are able to provide very high spatial resolution and very sensitive color resolution. As just one example, the SG-8060P MarkII High-end Input Scanner from Dainippon Screen claims to be capable of scanning at 12,000 dpi and providing 48-bit RGB resolution. Anticipated improvements in scanning technology are expected to make the capability for such high resolution and high density sensitivity more readily accessible and more affordable. This would mean, for example, that a scanner could have sufficient sensitivity to provide data with a bit depth exceeding 8-bits when scanning a highly sensitive media, even though 8-bit grayscale representation is sufficient for storing an image in human-readable form.

Conventionally, in converting a full-color image to a monochrome format only the relative lightness or darkness value of a color is used to determine a corresponding grayscale representation. Chroma information, which indicates color hue content, is largely ignored. For this reason, restoration of original color information to an image, once converted to monochrome format, is not easily feasible. It can be appreciated that image storage solutions that preserved some color information, even if approximate, could be advantageous.

Thus it can be seen that conventional document storage and preservation solutions fall far short of meeting the need to integrally couple data related to an image to the image itself. Even though the capability exists for reproducing and measuring image density sensitivity well in excess of the human-perceptible range, no use has been made of this excess capability for its data storage potential.

SUMMARY OF THE INVENTION

It is an object of the present invention to provide a method of encoding, in a monochrome medium, data about a document that has been received in electronic form. Briefly according to one aspect of the present invention the method comprises:

(a) converting the document to a rasterized image in which each pixel is assigned a raster value;

(b) for each pixel:

(b1) assigning a data word having a predetermined bit depth, the data word comprising a first data field and a second data field;

(b2) encoding a first component of the raster value into the first data field;

(b3) encoding a second data value into the second data field;

(b4) generating a grayscale data value comprising the first data field and the second data field;

(b5) forming, onto the monochrome medium, a grayscale pixel conditioned by the grayscale data value; and thereby encoding data about the document in the monochrome medium.

It is a feature of the present invention that it allows a coupling of data associated with a document to the document itself, in such a way that the coupled, encoded data is not easily separable from the image of the document, but does not obscure the image. At the same time, the coupled data can be encoded in a manner that is imperceptible, while the document itself is visible. The method of the present invention allows a document and its associated encoded data to be preserved on a monochrome preservation medium, available for future access and decoding.

The present invention takes advantage of the high levels of resolvability available with some types of monochromatic media. High-resolvability allows encoding of data in gray levels, where the number of gray levels that can be reproduced exceeds the number of distinct gray levels that can be distinguished by the human eye.

It is an advantage of the present invention that it provides a method for long-term preservation of a document and its associated data as a single unit.

It is yet a further advantage of the present invention that it provides a method for preserving, onto a monochrome medium, data about a full-color image.

It is yet a further advantage of the present invention that it provides a method for storing metadata associated with a document or with document image processing in a manner such that the metadata is closely coupled or, in some embodiments, integrally coupled to the document.

It is yet a further advantage of the present invention that it provides a method for storage of data having considerable density, yet without making existing equipment obsolete. That is, existing image sensing apparatus may not be able to take advantage of denser data encoding capabilities offered by the present invention, but can still be used for scanning an image preserved using these techniques, for example. For images, higher order density values typically store the lightness channel information, so that an image remains human-readable even if it contains considerable additional data content.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 9 is an example data listing for metadata information applicable to a media roll, cassette, or other unit; and FIGS. 10a through 10d show an example structure and data fields for metadata information applicable to a preserved document record.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
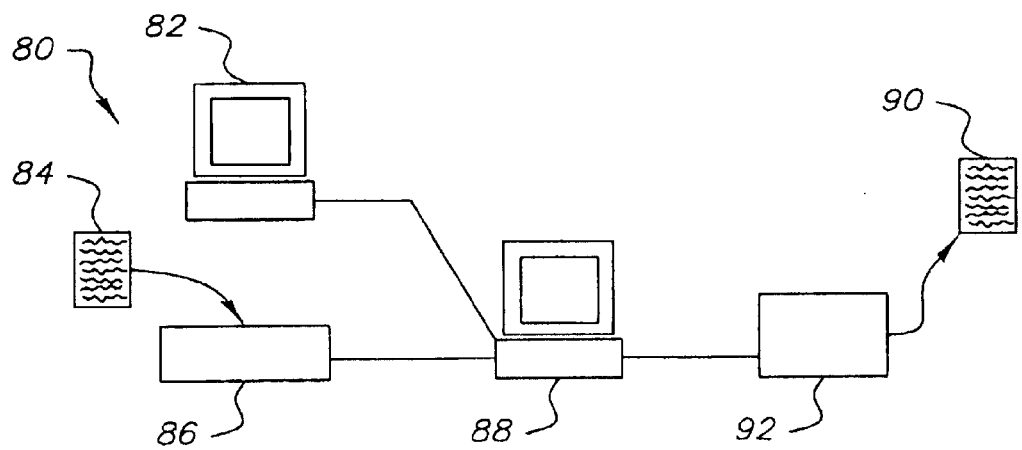
FIG. 1 is a block diagram showing the overall process by which a document can be preserved along with its associated encoded data.

Referring to FIG. 1, there is shown a preservation system 80 for accepting an input document and its associated data, encoding the data, and writing the rasterized image and data encoding onto a monochrome preservation medium to generate a preserved document record 90. A control processing unit 88, typically a computer workstation, accepts an input document in electronic form from any of a number of possible sources. One input source could be a networked graphics workstation 82. Alternately, an input document could be from a printed page 84, photograph, or other printed image that can be converted to electronic form by a scanner 86. Other possible document sources could include, but are not limited to, digital camera images, Photo CD images, on-line image archives, computer-generated images such as from CAD and graphics design software packages and multimedia software packages, document processing systems, and imaging instruments, for example. Documents could include data files of many types, including web pages, spreadsheets, email, electronic files from programs such as Microsoft Word, PowerPoint, Excel, and the like.

Control processing unit 88 accepts the document data from any suitable source and formats image data into a rasterized form suitable for a printer 92. In rasterized form, the document is converted into one or more images. Each rasterized image comprises a two-dimensional array of pixels, with each pixel having an assigned value, such as a tristimulus color value, for example. In addition, control processing unit 88 may also format, encode, and rasterize additional data or metadata to be associated with the document and to be imaged along with the document onto preserved image record 90. This additional data or metadata may be provided by software that executes on control processing unit 88 itself or may be provided from graphics workstation 82 or from some other data source. This data or metadata could include information entered by a user or customer of preservation system 80.

Monochrome Preservation Media for Images and Encoded Data

Examples of suitable human-readable preservation media for imaging by preservation system 80 include microfilm and related film products and other types of media having similar long-life expectancy and excellent image stability. In addition to film-based media, some other media types that may be acceptable, in some form, for use as human-readable preservation media include the following:

(a) electrophotographic media, when properly treated and finished;

(b) thermal media, such as thermal dye sublimation media;

(c) inkjet media, particularly using plastic film or reflective materials; and (d) metal plate materials, written using methods such as etching and laser ablation.

The materials that are used for human-readable preservation media are characterized by exceptionally long useful life. This is in contrast to conventional binary storage media, such as magnetic tapes or disks or optical storage media. These conventional media types are not readable to the human eye, whether aided by magnification or unaided, and are not suitable for reliable long-term data storage due to their relatively short lifespan and due to hardware and software dependencies for data access from these media. For example, changes to operating system, CPU, or application software can render data that has been recorded on binary storage media to be unusable. By contrast, data recorded on human-readable preservation media can still be interpreted, regardless of changes to CPU, operating system, or application software.

Preservation media are typically provided in some form capable of holding multiple records or frames. Typical formats include roll, cassette, or cartridge format. Preferably, the preservation medium exhibits a sufficient, controlled dynamic range that allows representation of many more individual grayscale levels than are distinguishable to the human eye. The potential excess capability of high-quality monochrome media, such as, for example, KODAK Film SO-240 produced by Eastman Kodak Company, Rochester, N.Y., makes it possible to utilize media of this type for encoding, into image pixels, related data that is associated with that image.

Stages in Document Processing

As the above description suggests, any of a number of types of data, including metadata, can be encoded for preservation on a monochrome medium along with the rasterized image of a document. A few of the numerous types of data that might commonly be preserved with an image include color data, audio, measurement, and animation data, for example. For the purpose of initial description, the processing sequence for preservation of document data that is described with reference to FIGS. 2 through 6 below uses, as an illustrative example, the encoding and preservation of tristimulus color data associated with an image document. Following the description for this type of encoding, the discussion of this specification then broadens its scope to encompass more general cases of encoding of associated data.

Figure 2:
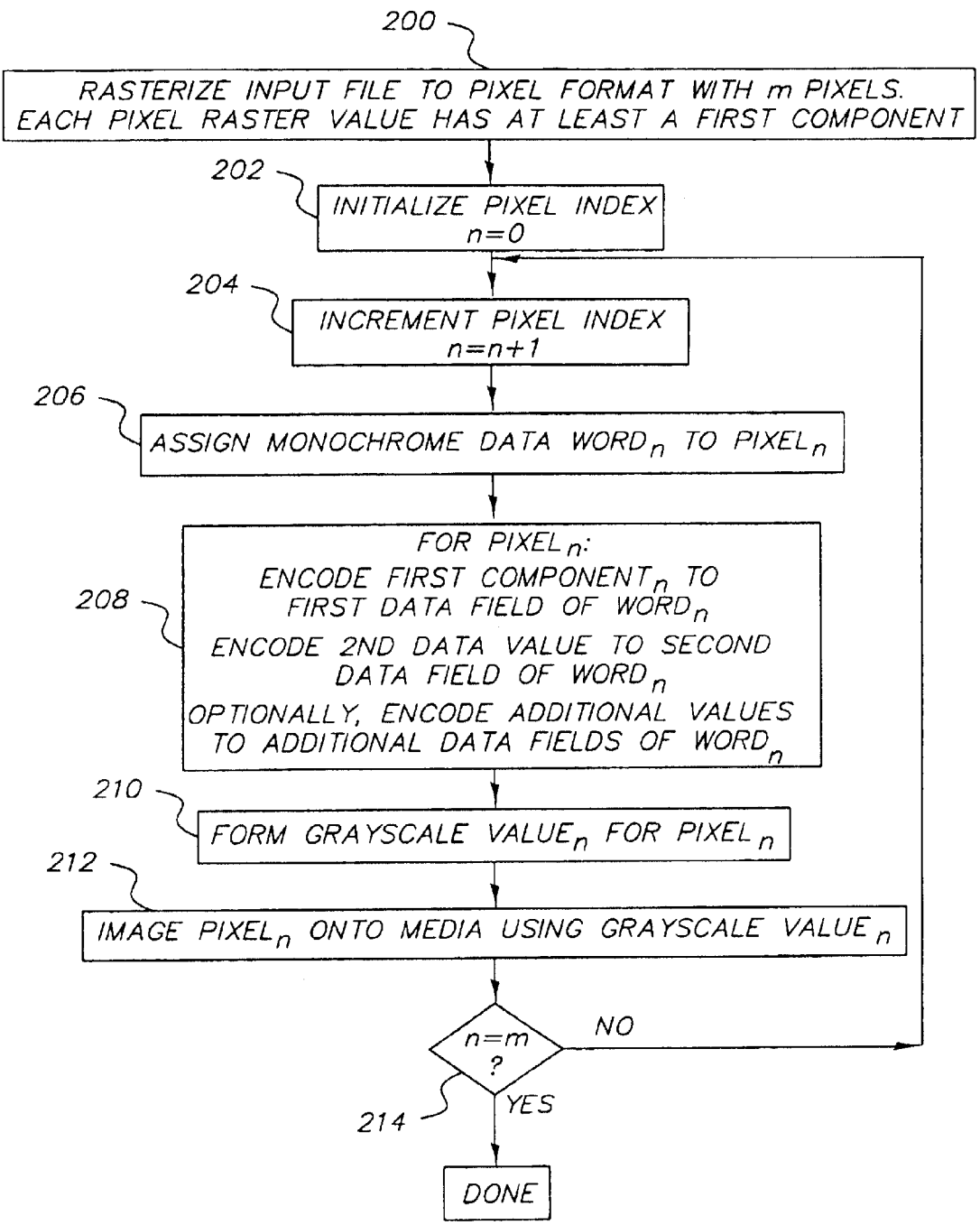
FIG. 2 is a flow chart illustrating key steps in processing for document preservation with associated encoded data.

Referring then to the flow chart of FIG. 2, there is shown a processing sequence for encoding document data to a monochrome medium. As was described above, an input file in electronic form is provided to this process; in the preferred embodiment, the input file includes a color image. A rasterization step 200 formats the input file to a rasterized, pixel format, where each pixel has an associated raster value. In the preferred embodiment, this raster value is a tristimulus color image value using CIELAB color space, with component values of lightness (L*), a-chroma (a*) and b-chroma (b*). A counter initialization step 202 and a counter increment step 204 are provided to illustrate the mechanics of looping operation for processing each image pixel. For each pixel, a monochrome word assignment step 206 assigns a word for storing encoded values for grayscale representation. The assigned monochrome data word has a predetermined bit depth that is a factor of the density resolution of the preservation medium, the density-marking characteristics of printer 92, and the performance characteristics of an intended scanning device for scanning and extracting encoded data at some future time. The data word is itself partitioned into a first data field, a second data field, and possible third and subsequent data fields. In the preferred embodiment, the monochrome data word has first, second, and third data fields for encoding lightness, a-chroma, and b-chroma values respectively. For each pixel an encoding step 208 is then executed. In encoding step 208, the first component value, lightness L* in the preferred embodiment, is encoded in a first data field of the monochrome data word. A second value is then encoded in a second data field of the monochrome data word. This is the a-chroma value a* in the preferred embodiment. The b-chroma value b* is then encoded in a third data field of the monochrome data word in the preferred embodiment. However, other types of data could alternately be encoded into the second, third, and subsequent data fields as part of encoding step 208. A number of data representation schemes can be employed for encoding additional values to additional data fields of the monochrome data word. At the conclusion of encoding step 208, a grayscale forming step 210 is then executed. In grayscale forming step 210, the various data fields in the monochrome data word are used to generate a grayscale value for imaging the pixel. The monochrome data word can be used without any modification; alternately, its fields can be concatenated or otherwise combined in some other order. In an imaging step 212, then, the pixel can be formed by printer 92 with the intended grayscale value generated in grayscale forming step 210. Finally, a looping decision step 214 determines whether or not each pixel has been assigned its grayscale value.

Those skilled in the computing arts can readily recognize that the flow chart of FIG. 2 illustrates only one possible implementation of image encoding and printing using a loop, using the mechanics of steps 202, 204, and 214. Alternate logic flow sequences could be used. In practice, imaging step 212 would most likely write the data for pixels into an intermediate memory buffer or similar structure, so that a complete image could be sent to printer 92 at one time. Regardless of the exact processing mechanics, however, the basic assignment and value mapping scheme outlined in steps 200, 206, 208, and 210 of FIG. 2 would be carried out in some fashion in order to implement the method of the present invention.

Figure 3:
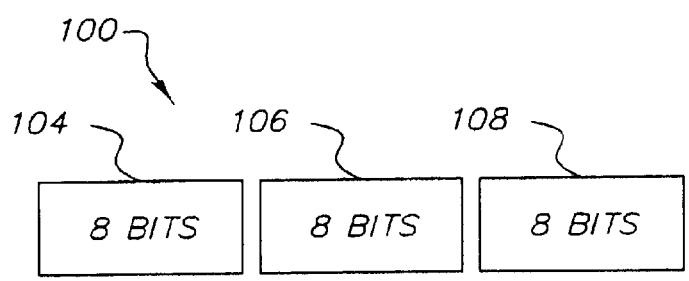
FIG. 3 is a visual representation of a data word having multiple data fields, each data field having a predetermined bit depth.

As shown in FIG. 3, for most standard tristimulus color imaging, the input file is encoded in a 24-bit raster value 100. A preprocessing step may be needed to convert color image data into a suitable format such as that represented in FIG. 3. One common color image format uses the familiar CIE 1976 L*a*b* or CIELAB color space of the CIE, Commission Internationale de l'Eclairage (International Commission on Illumination), well known to those skilled in the color imaging arts. For the CIELAB format, there are three channels of information: lightness (*L), chroma (a*) and chroma (b*). Each channel of information uses 8-bits, so that a complete 24-bit word is needed to express the CIELAB L*a*b* color space value of each image pixel, as was shown in FIG. 3. Raster value 100 as shown in FIG. 3 has a bit depth of 24-bits with three data components. A first data component 104 contains the L* channel value. A second data component 106 contains the a* channel value. A third data component 108 contains the b* channel value.

Ideally, it would be advantageous to be able to store each 24-bit CIELAB L*a*b* value for each pixel. However, there are two practical considerations that underlie the implementation of the encoding scheme that follows:

(1) limitations of the monochrome media. While it may be theoretically possible to accurately reproduce 10-, 12-, 14-bits or greater resolution on a monochrome medium, existing media and imaging techniques would make it very difficult to approach the 24-bit resolution that would be needed for full, lossless encoding.

(2) limitations of human perception. With respect to monochrome imaging, the human eye is sensitive to a limited number of grayscale monochrome gradations. In practice, as few as 16 different grayscale levels provide monochrome representations of color images that are considered visually accurate and pleasing.

Figure 4:
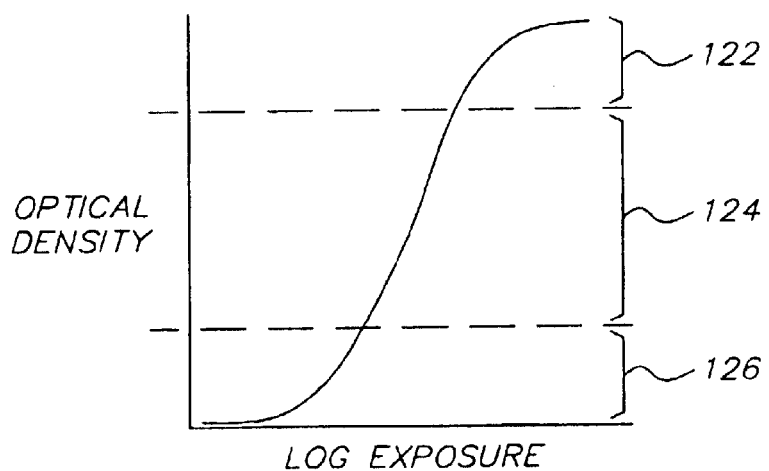
FIG. 4 is a graph showing a typical relationship of density to the logarithm of exposure energy for a typical photosensitive medium, indicating separate density ranges of interest.

As the graph of FIG. 4 shows for a typical photosensitive medium, the density response can be segmented into three overall regions. The human eye is most sensitive over a high-contrast region 124. The photosensitive medium also exhibits density response over a shoulder region 122 and a toe region 126, however, human perception is not highly sensitive within these high and low extremes. In conventional tristimulus color-to-monochrome mapping schemes, only high-contrast region 124 is used, and typically only for mapping to a corresponding lightness channel value.

Figure 5:
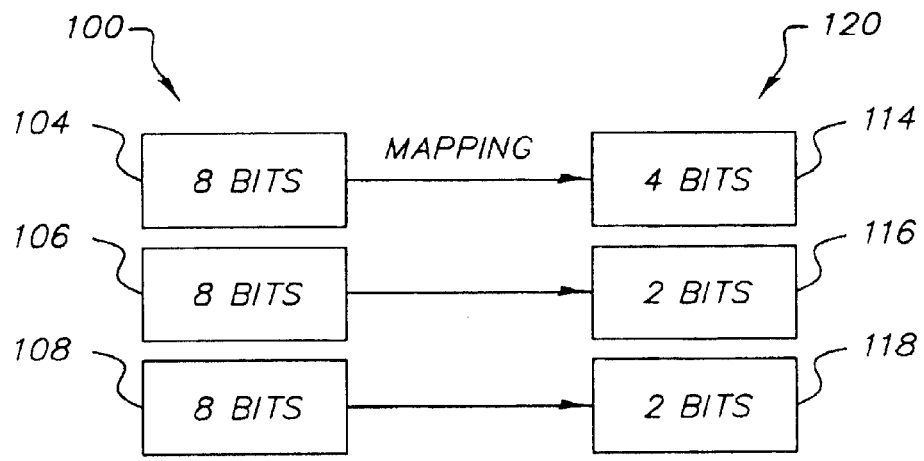
FIG. 5 is a visual representation of a mapping operation for correlating data fields within a data word of a larger bit depth to data fields within an 8-bit byte.

In light of these considerations, then, encoding step 208 of the present invention, shown in FIG. 2, performs a mapping from the 24-bit L*a*b* color space representation of raster value 100 to an 8-bit byte that serves as a monochrome data word 120. Referring to FIG. 5, there is shown the mapping scheme from raster value 100 to monochrome data word 120 as used in a preferred embodiment. The 8-bit value in first data component 104, containing the L* value, is mapped to a first data field 114, which contains 4-bits. This mapping enables as many as 16 discrete grayscale levels to be represented for the lightness values of pixels in the original color image. The 8-bit value in second data component 106, containing the a* value, is mapped to a second data field 116, which contains 2-bits. Similarly, the 8-bit value in third data component 108, containing the b* value, is mapped to a third data field 118, which also contains 2-bits.

For mapping of components 104, 106, and 108 to data fields 114, 116, and 118 respectively, a number of methods can be used. In the preferred embodiment, mapping is performed using a straightforward histogram and statistical techniques for mapping a large set of multiple values to a smaller set of representative key values, where each key value allows a reasonable approximation of a set of nearby larger values. For example, for actual image data values ranging from 18 to 23, a representative key value 20 may be chosen. Further encoding processes may then map key value 20 to an integer value that can be represented using 2 or 4-bits. Such statistical and mapping techniques, familiar in the data processing arts, enable effective "compression" of image data so that some amount of color data that may have been originally obtained at 8-bit resolution can be preserved in a 2-bit or 4-bit data field of monochrome data word 120.

In the preferred embodiment, as is shown in FIG. 5, the 2-bits for each a* value, and the 2-bits for each b* value in monochrome data word 120 allow the mapping of corresponding 8-bit chroma values to the appropriate one of the indexed a and b chroma values. Similarly, using 4-bits for the L* value allows mapping of an 8-bit lightness value to an appropriate indexed value with higher resolution.

Returning back to FIG. 2, grayscale forming step 210 may be no more complicated than simply using, as the grayscale value, all data fields 114, 116, and 118 in monochrome data word 120, plus any additional data fields into which monochrome data word 120 is partitioned. Optionally, depending on the available monochrome density resolution, customer requirements, or other factors, only individual data fields 114, 116, and 118 may be used or fields 114, 116, and 118 may be concatenated in any suitable combination.

The procedure of FIG. 2 is executed for all pixels in the rasterized document. Note that the monochrome image that prints as a result of the process described above with reference to FIG. 2 may have the same overall appearance as a monochrome image produced from a color image by using only the lightness L* channel information. However, unlike conventional methods that use a relative lightness value and preserve no chroma information, the method of the present invention allows an indexed lightness value to be represented and preserves chroma information in the lower 4-bits of the 8-bit grayscale value. Since the lower 4-bits are not readily perceptible to the human observer, the information stored in these bits does not interfere with the overall appearance of the preserved image, however, scanning the preserved image with a high-resolution scanning device will allow the encoding of the lower 4-bits to be retrieved.

Metadata about the Document

Figure 7:
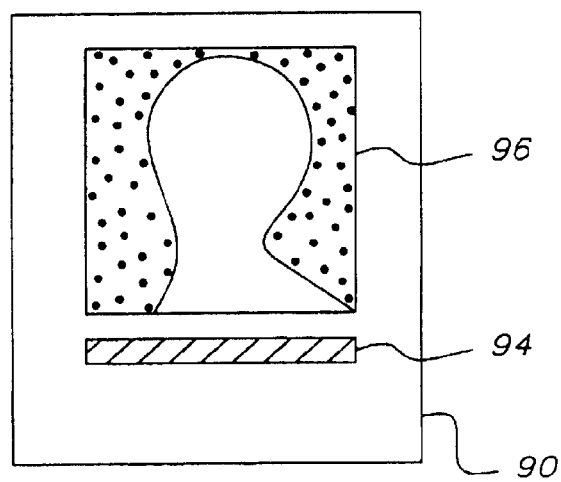
FIG. 7 is a plane view showing one possible layout arrangement for a preserved document record.

In addition to pixel grayscale values, there may be more information needed for re-creation of the original full-color image or needed for accompanying the image itself. Referring to FIG. 7, there is shown an encoded image 96 on preserved document record 90. Below image 96 is a document metadata section 94. Document metadata section 94 provides, in human-readable form, necessary information for interpreting the document data in encoded image 96. Information in document metadata section 94 could include any of the following, for example:

(a) key values or values that occur most frequently;

(b) color space parameters or pointers to a color palette;

(c) metadata on bit and data field assignment for grayscale values;

(d) data field concatenation scheme used; and (e) data field mapping scheme used.

Referring to FIGS. 10*a* through 10*d*, there is shown an example of the human-readable data provided in document metadata section 94.

In general, the metadata fields must be written in human-readable format. Text characters are typically used for encoding in a data format that is open, extensible, and self-defining, such as extensible markup language (XML), for example. This human-readability allows portions of the document to be scanned and automatically interpreted, for example, using tools such as optical character recognition (OCR).

FIG. 10*a* shows the overall structure of document metadata section 94 in a preferred embodiment. Encoded using XML, document metadata section 94 includes a header section 94*h*, followed by color channel sections 94*c*1, 94*c*2, and 94*c*3, one for each L*a*b* color channel. A terminating trailer section 94*t* denotes the end of the file for metadata section 94. FIGS. 10*b*, 10*c* and 10*d* then show metadata fields for color channel sections 94*c*1, 94*c*2, and 94*c*3 respectively. Each color channel section 94*c*1, 94*c*2 and 94*c*3 gives information on bit positions used for encoding color channel data, on value ranges, and on mapping definitions for encoding and decoding values. Ellipses ( . . . ) indicate where lines have been removed for simplifying and abbreviating FIGS. 10*a* and 10*b*.

By way of illustration, FIG. 10*b* shows how lightness L* values from 0 to 100 can be mapped to integers from 0 to 15, allowing the L* data to be encoded in a 4-bit data field 114. In the third mapping definition given, for example, minimum and maximum boundary values are listed as follows:

<Channel_Value min="12"max="17">

Following this boundary value listing, an encoded value from 0–15 is defined for the range, as follows:

<Encoded_Value>2</Encoded_Value>

Then, a value for decoding is provided, showing the value that will be assigned, from the original range of 0 to 100, upon decoding of the encoded value:

<Decode_Value>12</Decode_Value>

From this simple, partial illustration, it can be seen that, for an image encoded using this mapping method, values originally in the range 12–17 will be represented as value 12 when the document image is decoded and restored. There will be some loss of image quality; however, by selecting the mapping ranges carefully, a reasonably close approximation of the original document image can be preserved.

Metadata about the Media

Figure 8:
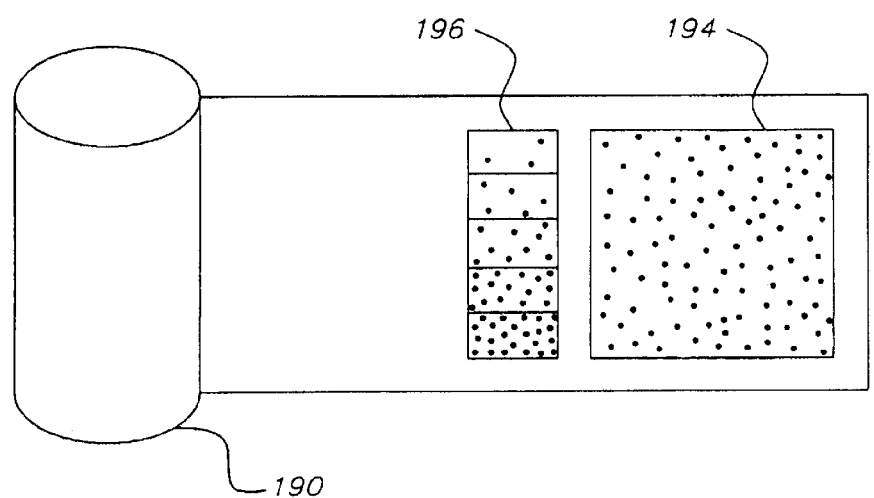
FIG. 8 is a plane view showing a metadata record and calibration strip on a media roll.

Referring to FIG. 8, media imaging characteristics must also be provided in order to decode encoded information from any image 96 on the media roll 190. In a preferred embodiment, the function of preserving media imaging characteristics is performed by assigning one or more separate media metadata documents 194 to document positions on media roll 190. Note that media roll 190 could be a roll of media or could be a cartridge, cassette, or other packaging unit. Information in media metadata document 194 could include any of the following, for example:

(a) media calibration data or look-up tables; and
(b) error-correction encoding information.

In order for media metadata document 194 to be useful on any future hardware platform, the encoded data in media metadata document 194 must be in human-readable form. Referring to FIG. 9, there is shown an example of a portion of the encoding of media metadata document 194 in the preferred embodiment. As shown in FIG. 9, media metadata document 194 may include write and read calibration data for the preservation medium and characteristics for printer 92.

In addition to the media metadata and image metadata components listed above, there can be additional metadata that is associated with the roll, cartridge, cassette, or other unit in which the preservation medium is packaged. This metadata can include information on media type, aging characteristics, directory or document tracking data, and other information, for example.

Referring again to FIG. 8, a calibration patch 196 is also provided as part of the media metadata to allow calibration of a scanner for reading individual pixels of each image 96. In a preferred embodiment, calibration patch 196 is provided along with metadata section 194. A number of alternatives are possible, including having calibration patch 196 associated with the individual image 96 or with a group of images 96. Calibration patch 196 could follow a simple format, establishing points along a non-linear density vs. code value curve or, where density is linear with respect to a range of code values, establishing end-points of a line or line segment. Calibration patch 196 could alternately include numeric annotation to identify the intended values for one or more densities reproduced in the patch.

The contone image mapping method described above is somewhat lossy. That is, due to the approximation provided using histograms and statistical techniques, a color image restored from its preserved document record 90 would not exhibit precisely its original colors in all cases. However, extensions of the embodiment described above could be used to improve storage for chroma as well as for lightness channels. For example, with 12-bit resolution, data fields 114, 116, and 118 could be scaled to 3- or 4-bits, allowing additional gradation in chroma data as stored. With higher resolution, additional data could be encoded. The method of the present invention can be practiced given any reasonably high resolution, with data fields assigned and organized accordingly. As a general principle, increasingly more robust arrangements are possible when larger bit depths become available.

Generalized Data Coupling to Document Image

Figure 6:
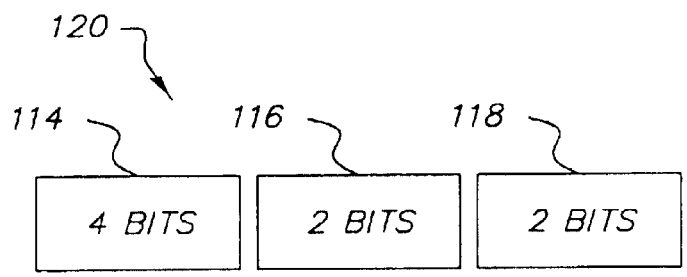
FIG. 6 is a visual representation of an 8-bit byte used in a mapping operation such as that illustrated in FIG. 5.

The example outlined above with reference to FIGS. 2 through 7 was directed to the encoding of L*a*b* values in monochrome pixels. The same method could alternately be adapted for storing other types of information within grayscale levels, with selected data fields in any of a number of arrangements. With reference to FIG. 6, for example, the visual appearance of an image could be preserved using first data field 114 for grayscale representation, while using second and third data fields 116 and 118, whether separately or combined, for storage of alternate information. For example, by combining second and third data fields 116 and 118, monochrome data words 120 for successive pixels could be used to store a sequence of audio bytes, with each monochrome data word 120, that is, each pixel; storing one half byte.

The mapping method of the preferred embodiment could be altered in a number of different ways within the scope of the present invention. For example, it might be desired to arrange fields differently for mapping L*a*b* values. In a particular application, there may be no advantage in printing an image with accurate monochrome representation; in such a case, L* values might be mapped to alternate fields within monochrome data word 120. Any arrangement of data fields could be used as an alternative to the structure shown in FIG. 6. For example, third data field 118 or some additional data field could be assigned for image metadata, security information, authentication information such as a digital signature, error correction data, information about the overall document, or a reference to such information. The data stored in a data field could be encoded data or could be one part of a byte, word, or other data unit, where the individual parts of the data unit span multiple pixels. A data field could store data directly, or store a reference or pointer to data, such as a pointer to a color palette, for example. Fields in addition to data fields 114, 116, and 118 could be assigned, for encoding additional data to be preserved in preserved document record 90.

Encoding Data Using Shadows/Highlights Regions

Referring back to the density curve of FIG. 4, it is instructive to observe that images are primarily represented using densities within high contrast region 124. In general, toe region 126, representing very low densities, and shoulder region 122, representing very high densities may be usable for data storage. This may mean using very dark or very light pixels within image 96 for storing encoded data, for example, where pixels above or below specific threshold densities are used primarily for data encoding.

Alternate Mapping Schemes

For preservation of color information, use of the CIELAB L*a*b* format is most favorable, since a lightness channel L* value easily maps to a corresponding grayscale value. However, data representation formats other than the tristimulus CIELAB L*a*b* format of the preferred embodiment can be used. For example, color data could be stored in CIELUV format, where tristimulus values represent brightness, hue, and saturation. Alternately, color data could be encoded in tristimulus RGB format, cyan, magenta, yellow (CMY) format or in CMYK format (with added black component). Or, color data could be encoded in a proprietary tristimulus data format, such as in KODAK Photo YCC Color Interchange Space, for example. In order to store all of the component values for the selected color space, the rasterized data values to be encoded would have a large bit depth, such as 24- or 32-bits in some cases. Monochrome data word 120, however, into which the components of tristimulus and other formats would be encoded, would have a small bit depth, such as the 8-bit monochrome data word 120 of FIG. 6. The arrangement of fields within monochrome data word 120 can be freely adapted to suit the encoding requirements for color accuracy. As with the L* channel information in the example of FIG. 5, it may work best to map one component of color data using relatively more bits. For RGB color data, for example, it may be most effective to map green values to a 4-bit field, while mapping red and blue values, which may have less impact on some images, to smaller 2-bit fields. The values used in any field could be pointers to other values, such as the L*, a* and b* channel values in first, second, and third data fields 114, 116, and 118 of FIG. 6. Or, these values could be sufficient in themselves, as might a 4-bit L* channel value stored in first data field 114. Overall, the methods of the present invention as disclosed herein could be used for mapping any type of color representation data format from one data structure to another.

Images printed on preserved document record 90 could be positive or negative, with image density appropriately assigned for the preservation medium.

Depending on factors such as image type, spatial resolution, and data bit depth available due to density resolution, any number of alternate mapping schemes could be implemented, including the following:

(a) use of "guard bits." Deliberate assignment of guard bits as separators for data fields may help to more clearly distinguish encoded data values; and (b) use of neighboring values and relative offsets. A number of data representation schemes can be employed that extrapolate image values for a pixel from those of neighboring pixels or that provide only offsets from an averaged value.

The invention has been described in detail with particular reference to certain preferred embodiments thereof, but it will be understood that variations and modifications can be effected within the scope of the invention. Therefore, what is provided is a method for preservation of data associated with an image on monochrome media.

Parts List

80. Preservation system
82. Graphics workstation
84. Printed page
86. Scanner
88. Control processing unit
90. Preserved document record
92. Printer
94. Metadata section
96. Image
100. Raster value
104. First data component
106. Second data component
108. Third data component
114. First data field
116. Second data field
118. Third data field
120. Monochrome data word
122. Shoulder region
124. High-contrast region
126. Toe region
190. Media roll
194. Media metadata document
196. Calibration patch
200. Rasterization step
202. Counter initialization step
204. Counter increment step
206. Monochrome word assignment step
208. Encoding step
210. Grayscale forming step
212. Imaging step
214. Looping decision step

What is claimed is:

1. A method of encoding, in a monochrome medium, data about a document that has been received in electronic form, the method comprising:

(a) converting the document to a rasterized image in which each pixel is assigned a raster value;

(b) for each pixel:

(b1) assigning a data word having a predetermined bit depth, said data word comprising a first data field and a second data field;

(b2) encoding a first component of said raster value into said first data field;

(b3) encoding a second data value into said second data field;

(b4) generating a grayscale data value comprising said first data field and said second data field; and (b5) forming, onto the monochrome medium, a grayscale pixel conditioned by said grayscale data value.

2. A method of encoding as in claim 1 wherein said monochrome medium is a photosensitive medium.

3. A method of encoding as in claim 1 wherein the document comprises computer generated images.

4. A method of encoding as in claim 1 wherein the document comprises text.

5. A method of encoding as in claim 1 wherein the document comprises a slide presentation.

6. A method of encoding as in claim 1 wherein the document comprises a web page.

7. A method of encoding as in claim 1 wherein the document comprises a spreadsheet.

8. A method of encoding as in claim 1 wherein said raster value comprises lightness and chroma data components.

9. A method of encoding as in claim 1 wherein said raster value comprises red, green, and blue data components.

10. A method of encoding as in claim 1 wherein said raster value comprises cyan, magenta, and yellow data components.

11. A method of encoding as in claim 1 wherein said raster value comprises hue, saturation, and lightness data components.

12. A method for encoding as in claim 1 wherein said second data value is lightness or chroma data.

13. A method for encoding as in claim 1 wherein said second data value is red, green, or blue data.

14. A method for encoding as in claim 1 wherein said second data value is cyan, magenta, or yellow data.

15. A method for encoding as in claim 1 wherein said second data value is hue, saturation, or lightness data.

16. A method of encoding as in claim 1 wherein said second data value comprises metadata about the document.

17. A method of encoding as in claim 1 wherein said second data value comprises encoded audio data.

18. A method of encoding as in claim 1 wherein said second data value comprises authentication data about the document.

19. A method of encoding as in claim 1 wherein said second data value comprises animation data about the document.

20. A method of encoding as in claim 1 wherein said second data value comprises security information about the document.

21. A method of encoding as in claim 1 wherein said second data value comprises information about data mapping.

22. A method of encoding as in claim 1 wherein said second data value comprises a reference to other information about the document.

23. A method of encoding as in claim 1 wherein said second data value comprises a pointer to a color palette.

24. A method of encoding as in claim 1 wherein said second data value comprises measurement data.

25. A method of encoding as in claim 1 wherein the step of encoding a first component of said raster value into said first data field is conditioned by a statistical frequency.

26. A method of encoding as in claim 1 further comprising the step of writing, onto said monochrome medium, a human-readable metadata record that comprises information for decoding said data about the document.

27. The method of encoding as in claim 1 wherein said second data value comprises error correction information.

28. The method of encoding as in claim 26 wherein said human-readable metadata record is in XML format.

29. The method of encoding as in claim 26 wherein said human-readable metadata record is readable by an optical character recognition apparatus.

30. The method of encoding as in claim 1 wherein said second data value comprises error correction information.

31. The method of encoding as in claim 26 wherein said human-readable metadata record is in XML format.

32. The method of encoding as in claim 26 wherein said human-readable metadata record is readable by an optical character recognition apparatus.

33. A method of encoding, in a monochrome medium, data about a document that has been received as a rasterized image, in which each pixel is assigned a raster value, the method comprising, for each pixel:
   (a) assigning a data word having a predetermined bit depth, said data word comprising a first data field and a second data field;
   (b) encoding a first component of said raster value into said first data field;
   (c) encoding a second data value into said second data field;
   (d) generating a grayscale data value comprising said first data field and said second data field; and
   (e) forming, onto the monochrome medium, a grayscale pixel conditioned by said grayscale data value.

34. A method of encoding as in claim 33 wherein said monochrome medium is a photosensitive medium.

35. A method of encoding as in claim 33 wherein the document comprises computer generated images.

36. A method of encoding as in claim 33 wherein the document comprises a scanned image.

37. A method of encoding as in claim 33 wherein the document comprises a digital camera image.

38. A method of encoding as in claim 33 wherein said raster value comprises lightness and chroma data components.

39. A method of encoding as in claim 33 wherein said raster value comprises red, green, and blue data components.

40. A method of encoding as in claim 33 wherein said raster value comprises cyan, magenta, and yellow data components.

41. A method of encoding as in claim 33 wherein said raster value comprises hue, saturation, and lightness data components.

42. A method for encoding as in claim 33 wherein said second data value is lightness or chroma data.

43. A method for encoding as in claim 33 wherein said second data value is red, green, or blue data.

44. A method for encoding as in claim 33 wherein said second data value is cyan, magenta, or yellow data.

45. A method for encoding as in claim 33 wherein said second data value is hue, saturation, or lightness data.

46. A method of encoding as in claim 33 wherein said second data value comprises metadata about the document.

47. A method of encoding as in claim 33 wherein said second data value comprises encoded audio data.

48. A method of encoding as in claim 33 wherein said second data value comprises authentication data about the document.

49. A method of encoding as in claim 33 wherein said second data value comprises animation data about the document.

50. A method of encoding as in claim 33 wherein said second data value comprises security information about the document.

51. A method of encoding as in claim 33 wherein said second data value comprises information about data mapping.

52. A method of encoding as in claim 33 wherein said second data value comprises a reference to other information about the document.

53. A method of encoding as in claim 33 wherein said second data value comprises a pointer to a color palette.

54. A method of encoding as in claim 33 wherein said second data value comprises measurement data.

55. A method of encoding as in claim 33 wherein the step of encoding a first component of said raster value into said first data field is conditioned by a statistical frequency.

56. A method of encoding as in claim 33 further comprising the step of writing, onto said monochrome medium, a human-readable metadata record that comprises information for decoding said data about the document.

57. A method of storing, on a monochrome medium, a tristimulus color image value associated with each pixel in a color document, wherein each tristimulus color image value comprises a first data value, a second data value, and a third data value, the method comprising:
   (a) assigning a data word to said each pixel, said data word having a predetermined bit depth for storing a grayscale value, said data word comprising a first field, a second field, and a third field;
   (b) encoding, for each said pixel, said first data value in said first field, said second data value in said second field, and said third data value in said third field, thereby forming said grayscale data value in said data word; and
   (c) forming a grayscale image onto the monochrome medium, wherein the density of said each pixel corresponds to said grayscale data value in said data word for each said pixel.

58. The method of storing a tristimulus color value as in claim 57 wherein said first data value is a lightness value, said second data value is an a-channel chroma value, and said third data value is a b-channel chroma value.

59. The method of storing a tristimulus color value as in claim 57 wherein said first data value is a brightness value, said second data value is a hue value, and said third data value is a saturation value.

60. The method of storing a tristimulus color value as in claim 57 wherein said first data value is a red value, said second data value is a green value, and said third data value is a blue value.

61. The method of storing a tristimulus color value as in claim 57 wherein said first data value is a cyan value, said second data value is a magenta value, and said third data value is a yellow value.

62. The method of storing a tristimulus color image value as in claim 57 wherein the step of encoding said first data value in said first field is conditioned by the statistical frequency of said first data value in said color image.

63. A method of storing, on a monochrome medium, a CMYK color image value associated with each pixel in a color document, wherein each CMYK color image value comprises a first data value, a second data value, a third data value, and a fourth data value, the method comprising:
   (a) assigning a data word to said each pixel, said data word having a predetermined bit depth for storing a grayscale value, said data word comprising a first field, a second field, a third field and a fourth field;

(b) encoding, for each said pixel, said first data value in said first field, said second data value in said second field, said third data value in said third field, and said fourth data value in said fourth field, thereby forming said grayscale data value in said data word; and (c) forming a grayscale image onto the monochrome medium, wherein the density of said each pixel corresponds to said grayscale data value in said data word for each said pixel.

* * * * *